R. GRAVES.
Jointer for Plow.

No. 221,053. Patented Oct. 28, 1879.

WITNESSES:
C. Neveux
C. Sedgwick

INVENTOR:
R. Graves
BY Munn & Co.
ATTORNEYS.

UNITED STATES PATENT OFFICE.

REUBEN GRAVES, OF HOPE TOWN, (LOSTANT P. O.,) LA SALLE COUNTY, ILL.

IMPROVEMENT IN JOINTERS FOR PLOWS.

Specification forming part of Letters Patent No. 221,053, dated October 28, 1879; application filed August 27, 1879.

*To all whom it may concern:*

Be it known that I, REUBEN GRAVES, of Hope Town, (Lostant P. O.,) in the county of La Salle a d State of Illinois, have invented a new and useful Improvement in Jointers for Plows, of which the following is a specification.

Figure 1:
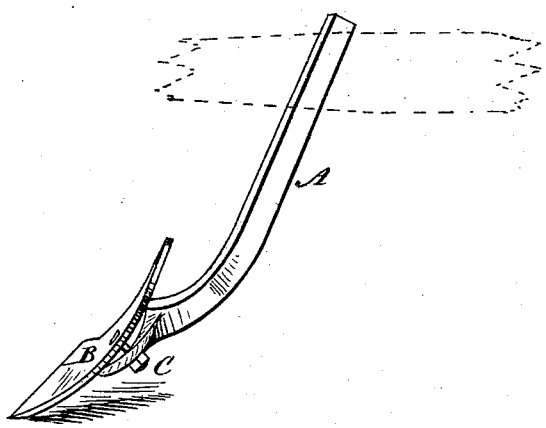
Figure 3:
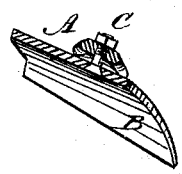
Figure 2:
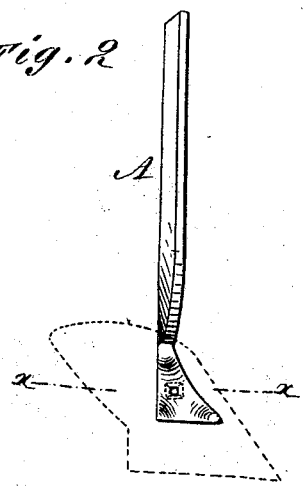

Figure 1 is a perspective view of my improved jointer. Fig. 2 is a front view of the jointer-standard, showing, in dotted lines, the position of the plow-plate. Fig. 3 is a detail cross-section of the same, taken through the line $x$ $x$, Fig. 2.

Similar letters of reference indicate corresponding parts.

The object of this invention is to furnish an improved jointer for plows which shall be so constructed that it may be adjusted to throw its furrow-slice forward or sidewise or rearward, that it may be leveled however its standard may be attached to the plow-beam, and that it may be adjusted to cut its furrow-slice loose from the ground, and which shall be simple in construction, easily adjusted, firmly held, and effective in use.

The invention consists in the jointer, formed by the combination of the standard made with a triangular concaved foot, forming three bearing-points, and having a round bolt-hole through its middle part, the plow-plate, provided with a square bolt-hole, and the bolt having the part that passes through the plow-plate square and the part that passes through the standard-foot round, as hereinafter fully described.

A represents the standard, which is designed to be firmly clamped to the plow-beam. The foot of the standard A is widened into triangular form, and is concave upon its forward side, leaving three points at its angles for the plow-plate B to rest upon. The plow-plate B is made in about the shape of an ordinary turnplow, and is secured to the foot of the standard A by a single bolt, C. The bolt-hole through the plow-plate B is made square, and the part of the bolt C that passes through the said plow-plate is also made square. The bolt-hole through the middle part of the foot of the standard A is made round, and the part of the bolt C that passes through the said foot is also made round, so that the plow-plate B can be adjusted in any desired position by loosening the nut upon the bolt C, and will be held firmly in place by tightening the said nut.

The standard A may be fastened to the plow-beam vertically, or inclined forward or rearward, and the plow-plate can be so adjusted that its share will be level whatever be the position of the standard.

By inclining the standard to the rearward and leveling the plow-plate the furrow-slice will be thrown forward, and by inclining the standard forward and leveling the plow-plate the furrow-slice will be thrown sidewise and rearward. By adjusting the plow-plate with its share inclined the furrow-slice will be cut loose from the sod.

I am aware that it is not new to secure a centrally-apertured share to the standard, or to attach a scraper adjustably to the rear of a plow-lever; but

What I claim as new and of my invention is—

The jointer formed by the combination of the standard A, made with a triangular concaved foot, forming three bearing-points, and having a round bolt-hole through its middle part, the plow-plate B, provided with a square bolt-hole, and the bolt C, having the part that passes through the plow-plate B square and the part that passes through the standard-foot round, substantially as herein shown and described.

REUBEN GRAVES.

Witnesses:
THOMAS DREW,
WILLIAM HAGY.